United States Patent
Yoshida

(10) Patent No.: US 7,819,451 B2
(45) Date of Patent: Oct. 26, 2010

(54) CARGO NET FOR VEHICLE

(75) Inventor: Atsushi Yoshida, Raymond, OH (US)

(73) Assignee: Honda Access Corporation, Niiza-shi (JP)

( * ) Notice: Subject to any disclaimer, the term of this patent is extended or adjusted under 35 U.S.C. 154(b) by 175 days.

(21) Appl. No.: 12/125,488

(22) Filed: May 22, 2008

(65) Prior Publication Data

US 2009/0288787 A1    Nov. 26, 2009

(51) Int. Cl.
*B60N 3/00* (2006.01)
(52) U.S. Cl. ..................... 296/24.4; 410/118
(58) Field of Classification Search ........... 296/24.4, 296/37.16, 24.43, 37.5, 24.46; 410/118, 410/129, 117, 100, 97; 280/749
See application file for complete search history.

(56) References Cited

U.S. PATENT DOCUMENTS

| | | | | |
|---|---|---|---|---|
| 2,507,842 | A | * | 5/1950 | Waddill ............... 224/560 |
| 5,090,856 | A | * | 2/1992 | Moore ............... 410/118 |
| 5,186,587 | A | * | 2/1993 | Moore ............... 410/118 |
| 5,340,004 | A | * | 8/1994 | Moore ............... 224/563 |
| 5,542,591 | A | * | 8/1996 | Moore et al. ......... 224/545 |
| 5,628,442 | A | * | 5/1997 | Wayne ............... 224/543 |
| 5,772,370 | A | * | 6/1998 | Moore ............... 410/100 |
| 5,924,611 | A | | 7/1999 | Mizuno |
| RE36,345 | E | * | 10/1999 | Moore ............... 224/563 |
| 6,099,222 | A | * | 8/2000 | Moore ............... 410/100 |
| 6,145,170 | A | * | 11/2000 | Bernard et al. ......... 24/298 |
| 6,302,463 | B1 | * | 10/2001 | Moore et al. ............. 296/24.43 |
| 6,334,562 | B1 | | 1/2002 | Ament et al. |
| 6,439,633 | B2 | * | 8/2002 | Nemoto ............... 296/37.14 |
| 6,460,912 | B2 | * | 10/2002 | Moore et al. ............. 296/24.43 |
| 6,612,606 | B1 | * | 9/2003 | Bergenheim et al. ..... 280/728.1 |
| 6,722,542 | B2 | * | 4/2004 | McMurray et al. ......... 224/563 |
| 6,739,812 | B1 | * | 5/2004 | Pfeifer et al. ............. 410/118 |
| 6,821,600 | B1 | * | 11/2004 | Henson ............... 428/99 |

(Continued)

FOREIGN PATENT DOCUMENTS

DE    19531304 A1    2/1997

(Continued)

OTHER PUBLICATIONS

United Kingdom Search Report of GB0903500.7, dated Apr. 8, 2009.

*Primary Examiner*—Kiran B. Patel
(74) *Attorney, Agent, or Firm*—Westerman, Hattori, Daniels & Adrian, LLP

(57) ABSTRACT

A cargo net for vehicle enabling stored luggage to be prevented from being damaged by vibrations transmitted from a floor of a luggage compartment. A cargo net 1 comprises a first partition member 2 and a second partition member 3 having one end 3*a* thereof connected with one end of the first partition member 2, so that it is detachably attached to a luggage compartment 5 of a vehicle 4. The first and second partition members 2, 3 are formed into a pouched shape, each including an openable and closable portion 12 near the center of the luggage compartment 5. The cargo net 1 can hold the luggage 21 stored in the second partition member 3 without being contacted by the floor 5*a* of the luggage compartment 5, the stored luggage 21 can be prevented from being damaged by the vibration of the vehicle 4 from the floor 5*a*.

12 Claims, 9 Drawing Sheets

U.S. PATENT DOCUMENTS

| | | | | |
|---|---|---|---|---|
| 6,962,382 B2* | 11/2005 | Scarlett | ............. | 296/24.46 |
| 7,025,404 B1* | 4/2006 | Gilbert | ............. | 296/102 |
| 7,080,677 B2* | 7/2006 | Nolle | ............. | 160/329 |
| 7,318,617 B1* | 1/2008 | Scotton | ............. | 296/37.16 |
| 2002/0043543 A1 | 4/2002 | McMurray et al. | | |
| 2005/0045682 A1* | 3/2005 | Tarrant et al. | ............. | 224/498 |
| 2005/0084359 A1* | 4/2005 | Dempsey et al. | ............. | 410/118 |
| 2005/0284867 A1* | 12/2005 | Sander et al. | ............. | 220/23.86 |
| 2006/0103155 A1* | 5/2006 | Spater et al. | ............. | 296/24.46 |
| 2006/0180623 A1* | 8/2006 | Reynolds et al. | ............. | 224/542 |
| 2008/0145172 A1* | 6/2008 | Sturt et al. | ............. | 410/118 |
| 2009/0058138 A1* | 3/2009 | Cech et al. | ............. | 296/190.02 |
| 2009/0304476 A1* | 12/2009 | Pickens et al. | ............. | 410/118 |

FOREIGN PATENT DOCUMENTS

| | | |
|---|---|---|
| JP | 11-314549 A | 11/1999 |

* cited by examiner

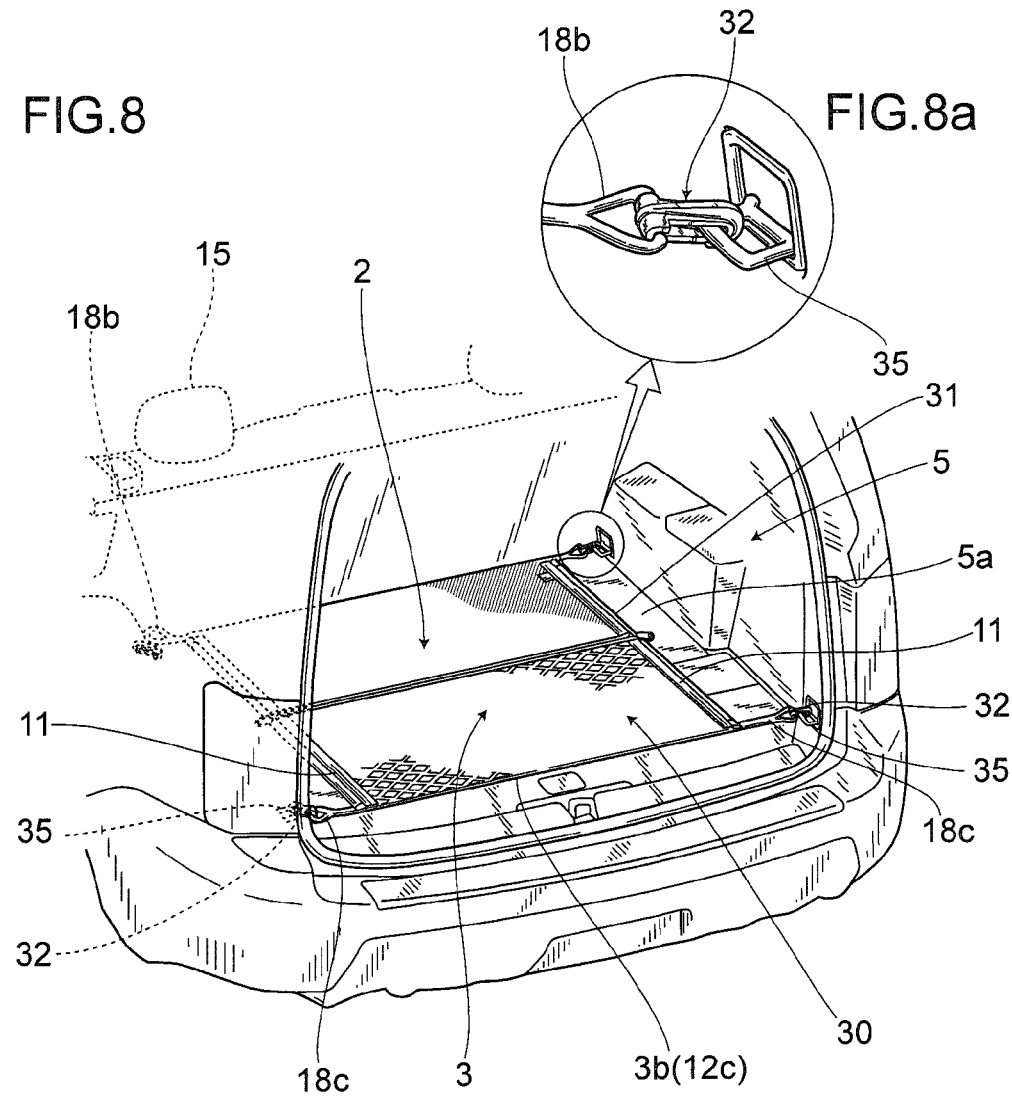

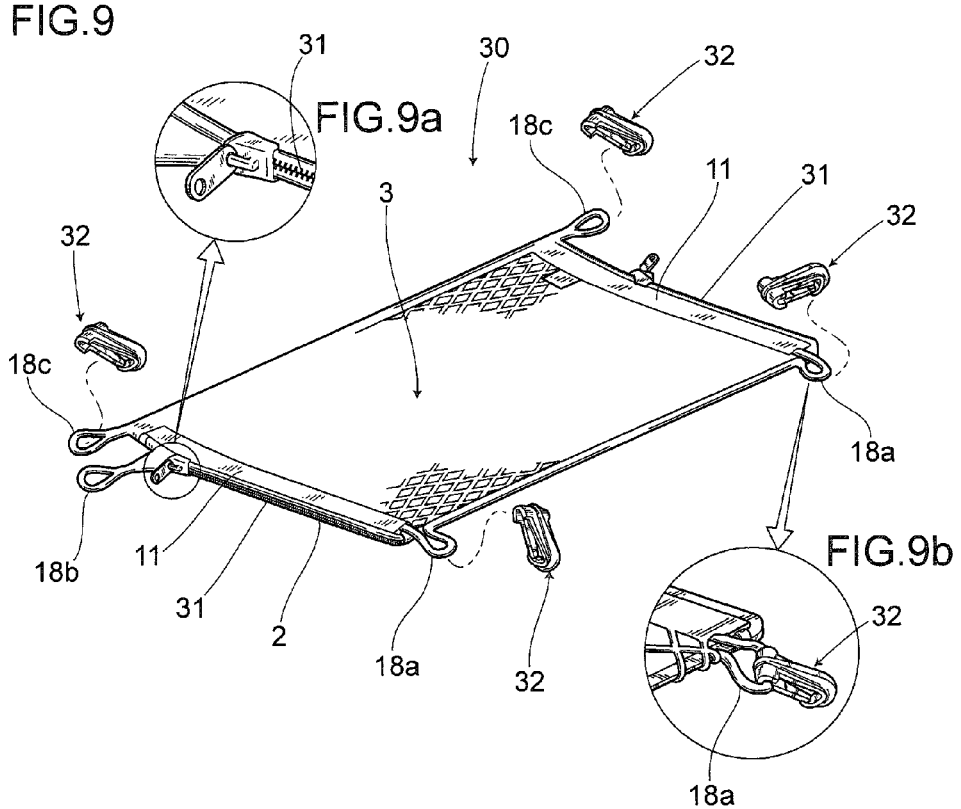

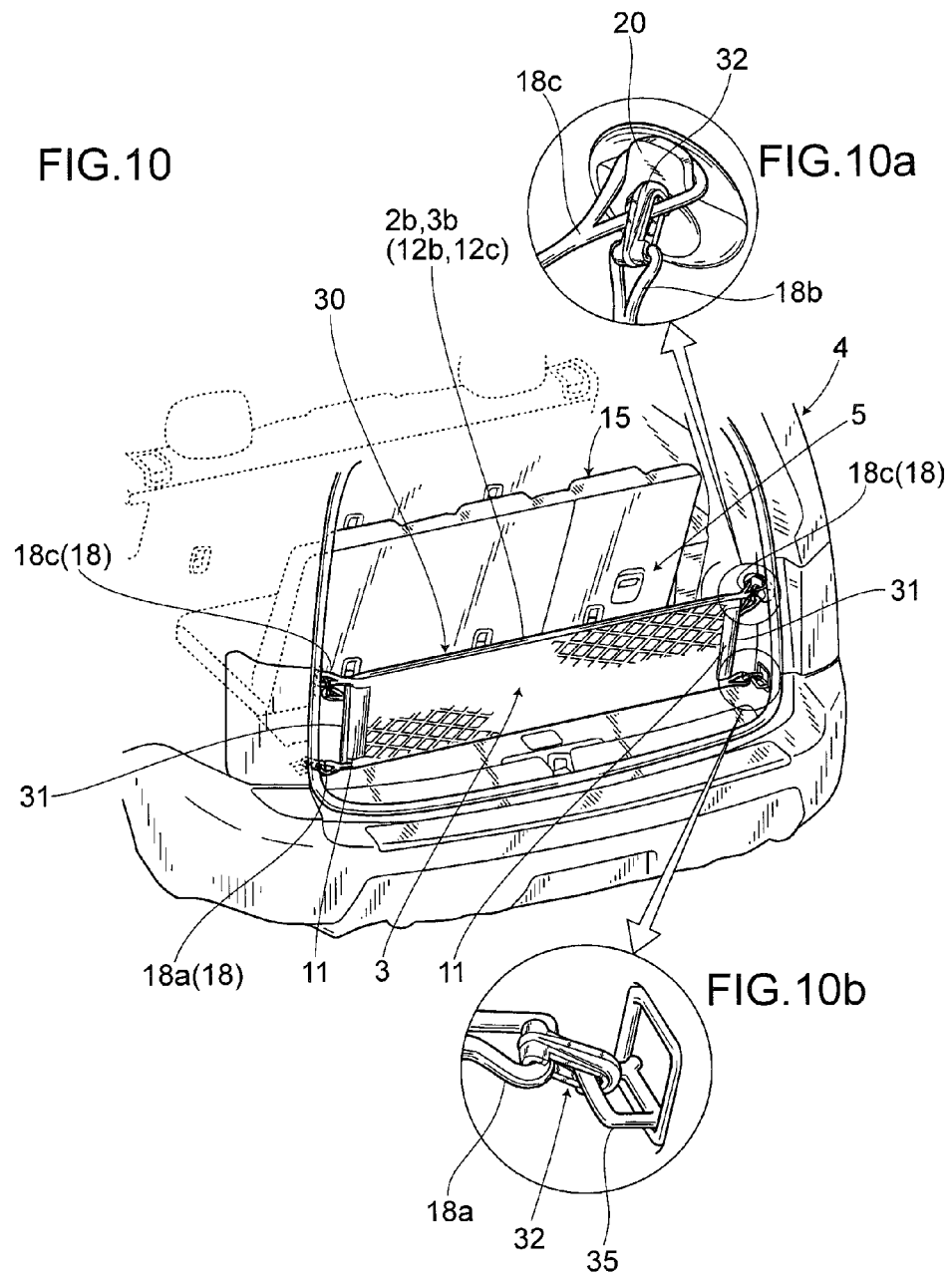

CARGO NET FOR VEHICLE

TECHNICAL FIELD

The present invention relates to a cargo net for vehicle, particularly to the one including partition members formed in a pouched shape.

BACKGROUND OF INVENTION

Conventionally, as this kind of a cargo net for vehicle, U.S. Pat. No. Re. 36,345, for example, discloses an automotive storage net comprising: one sheet of a meshed member folded in half with both ends thereof being joined together; and an opening formed at a top end so that luggage or the like may be stored through the opening. The storage net is vertically provided on a pickup bed.

According to the conventional art, however, the storage net is vertically provided, and thus the luggage or items stored thereinside comes in direct contact with the floor of the pickup bed, As a result, there has been concern that it is difficult to store said luggage or the like in an appropriate manner since an impact is sometimes imparted directly to said luggage from the floor surface of the pickup bed, due to the vibrations of the vehicle during the travel thereof, for example.

SUMMARY OF THE INVENTION

In view of the above-mentioned problems, it is, therefore, an object of the present invention to provide a cargo net for vehicle which enables even fragile items or the like to be stored in an appropriate manner by suppressing the vibrations of the vehicle transmitted from the floor surface of a luggage compartment to the stored items.

A cargo net for vehicle according to a first aspect of the invention is the one that is detachably attached to a luggage compartment of the vehicle, comprising a first partition member and a second partition member having one end thereof connected with one end of said first partition member,
wherein said first and second partition members are formed into a pouched shape, comprising at least one openable and closable portion provided at an outer edge in a longitudinal direction thereof.

The cargo net for vehicle according to a second aspect of the invention is the one set forth in the first aspect, wherein said first and second partition members each include a partition surface formed of a netted fabric.

The cargo net for vehicle according to a third aspect of the invention is the one set forth in the second aspect, wherein said partition surfaces include a first partition surface defining a first side surface and a second partition surface defining a second partition surface, wherein said first partition surface is netted more densely than said second partition surface.

The cargo net for vehicle according to fourth to sixth aspects of the invention is the one set forth in any one of the first to third aspects, wherein one of said first and second partition members is provided at its end with a fastening portion that engages with a rear surface of a seat installed in said vehicle.

The cargo net for vehicle according to seventh to twelfth aspects of the invention is the one set forth in any one of the first to sixth aspects, wherein at least one of said first and second partition members covers a rear surface of a seat installed in said vehicle.

According to the cargo net for vehicle as set forth in the first aspect, fragile items or the like are capable of being stored in an appropriate manner by suppressing the vibrations of the vehicle transmitted from the floor surface of the luggage compartment.

According to the cargo net for vehicle as set forth in the second aspect, the cargo net is formed of a netted fabric, thus making it possible to visually inspect from external how the stored luggage is being stored.

According to the cargo net for vehicle as set forth in the third aspect, the second partition member comprises the first partition surface formed of a densely-netted fabric that is arranged at the upper side of the luggage compartment 5, thus enabling the stored luggage to be prevented from being seen through a window from the outside.

According to the cargo net for vehicle as set forth in the fourth to sixth aspects, degree of freedom in attachment position can be improved.

According to the cargo net for vehicle as set forth in the seventh to twelfth aspects, the luggage stored in the first partition member or the second partition member can be held stably.

BRIEF DESCRIPTION OF THE DRAWINGS

The invention will be more readily understood by reference to the following description, taken with the accompanying drawings, in which

FIG. 8 is a perspective view showing a first example of use of the cargo net in accordance with the second embodiment of the present invention, while FIG. 8a is a partially enlarged view thereof.

FIG. 9 is a perspective view showing a second example of use of the cargo net in accordance with the second embodiment of the present invention, while FIGS. 9a and 9b are partially enlarged views thereof.

FIG. 10 is a side view showing the second example of use of the cargo net in accordance with the second embodiment of the present invention, in which said cargo net is installed in a luggage compartment, while FIGS. 10a and 10b are partially enlarged views thereof.

DETAILED DESCRIPTION OF PREFERRED EMBODIMENTS

Next is a description of preferred embodiments of the present invention with reference to the attached drawings.

First Embodiment

Figure 1:
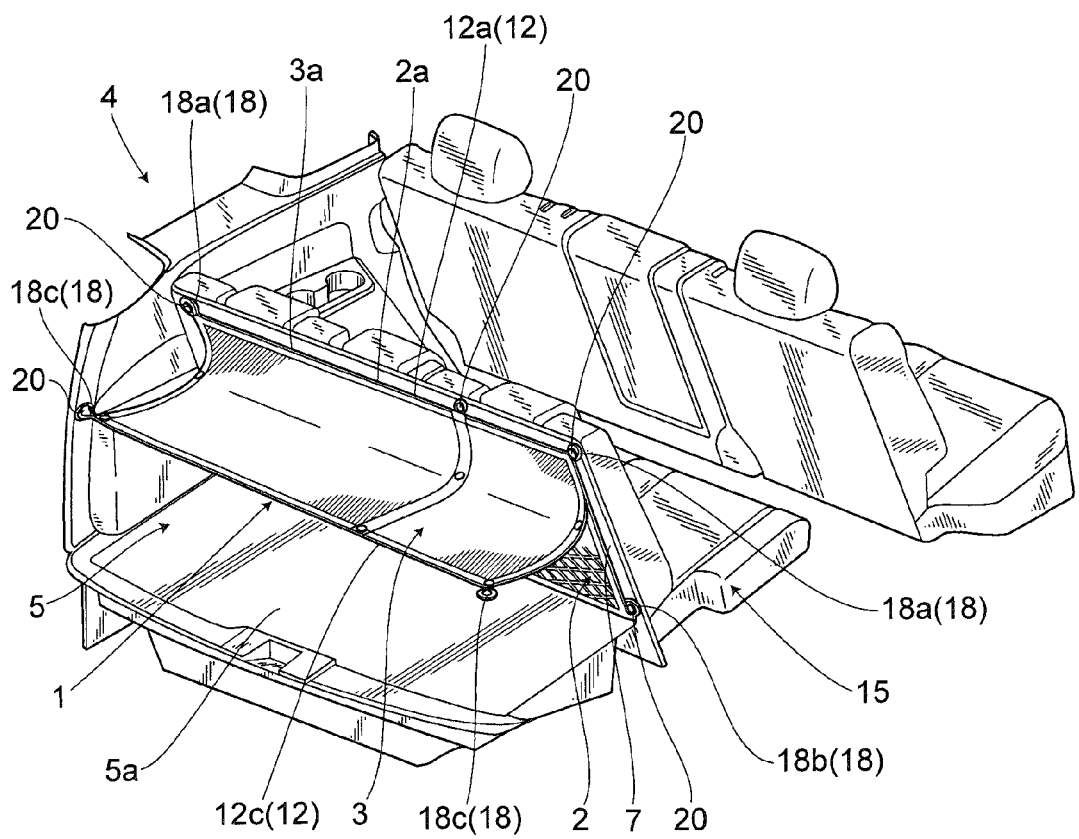
FIG. 1 is a perspective view showing a first example of use of a cargo net in accordance with a first embodiment of the present invention.

The cargo net 1 for vehicle (hereinafter called "cargo net") shown in FIG. 1 comprises a first partition member 2 and a second partition member 3 having a first end 3a connected with a first end 2a of said first partition member 2, and is detachably attached to a luggage compartment 5 of a vehicle 4.

Moreover, said first partition member 2 and said second partition member 3 are formed into a pouched shape. According to the cargo net 1, the first partition member 2 is allowed to be attached to a rear surface 7 of the seat back 15, while the second partition member 3 is allowed to be hung on an inner side surface of the luggage compartment 5 so as to be held horizontally.

Thus, the cargo net 1 is constituted so that luggage 21 or the like stored in the second partition member 3 can be held in a position distant upwardly from a floor 5a of the luggage compartment 5.

Figure 2:
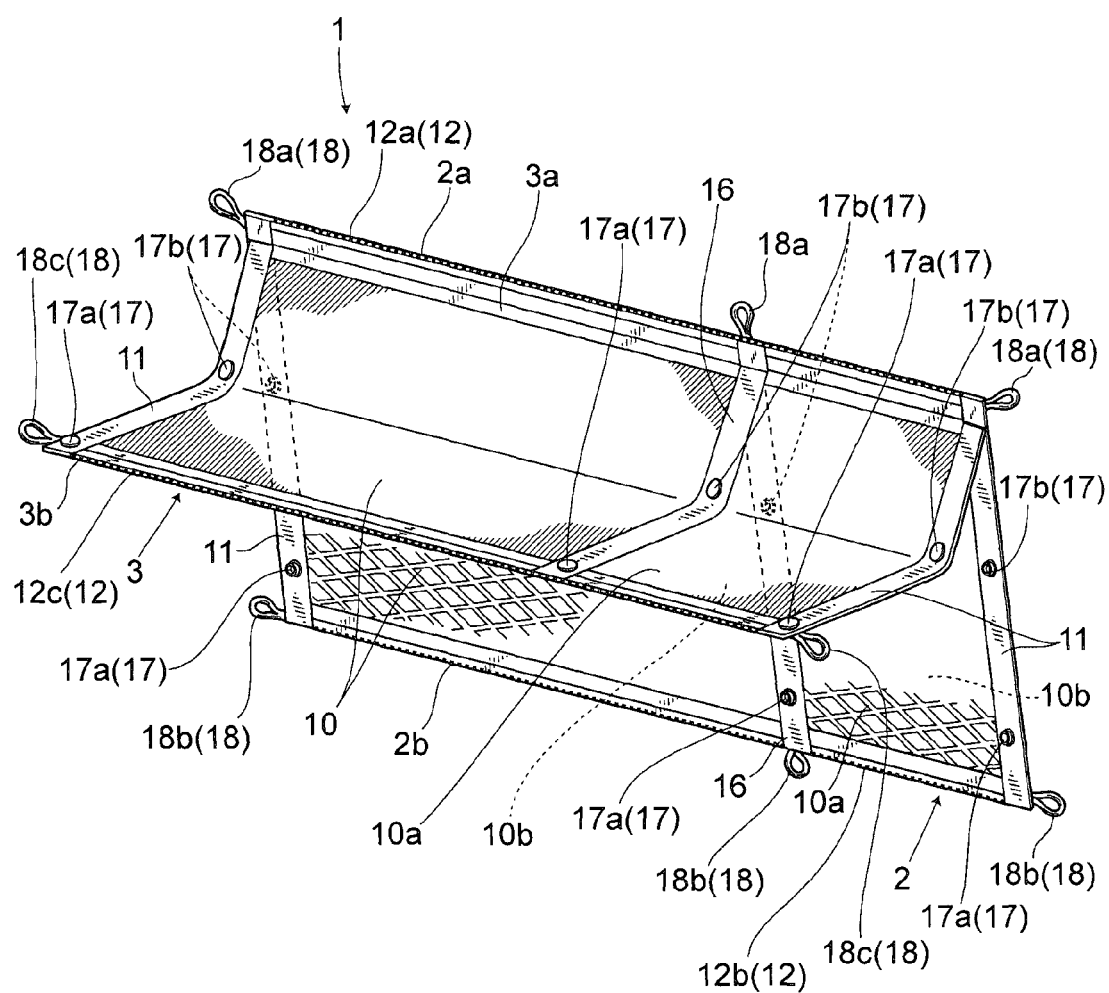
FIG. 2 is a perspective view showing an overall structure of the cargo net in accordance with the first embodiment of the present invention.

As shown in FIG. 2, the first partition member 2 and the second partition member 3 each include a partition surface 10 that is formed of a netted fabric, having a horizontally elongated rectangular shape. This partition surface 10 is formed of a netted fabric made of polyester, having a first partition surface 10a that makes up a first side surface, and a second partition surface 10b that makes up a second side surface. Both end edges thereof are sewed and joined together with side edges 11 made of a strip-shaped member.

The first partition surface 10a is formed from a netted fabric that is more densely netted than said second partition surface 10b. This first partition member 2 has substantially the same surface area as the rear surface 7 of the seat back 15 such that the former can cover the latter entirely. In the meantime, the first partition member 2 and the second partition member 3 each include a longitudinal outer edge and a transverse outer edge, in which the transverse outer edges are the ones located at both sides of the partition members, while the longitudinal outer edges are the ones located at first and second ends connecting both sides.

The first partition member 2 and the second partition member 3 are provided with an openable-and-closable portion 12 in the outer edge thereof in the longitudinal direction, respectively, so that luggage 21 etc. can be stored therein through each openable-and-closable portion 12. According to the present embodiment, a first end 2a of the first partition member 2 is formed with an openable-and-closable portion 12a, a second end 2b thereof is formed with an openable-and-closable portion 12b, and a second end 3b of the second partition member 3 is formed with an openable-and-closable portion 12c, respectively. A slide fastener is provided in these openable-and-closable portions 12a, 12b, and 12c, respectively, so that an opening thereof can be opened and closed freely.

The first partition member 2 and the second partition member 3 are each provided with an intermediate portion 16 made of a strip-shaped member on the partition surface 10 between both side edges 11, corresponding to the width of the seat back 15 installed in the vehicle 4. In the present embodiment, the intermediate portion 16 is provided near one of the side edges 11.

A locking button 17 as a joining means is provided on a surface of each of the intermediate portions 16 and both side edges 11. The locking button 17 comprises an outer button 17a provided at the second end and a central button 17b provided in the center between the first and second ends, which are provided in pairs, respectively (i.e., six pieces in all).

Moreover, a fastening portion 18 is provided at the first and second ends 2a, 2b of the first partition member 2, respectively. This fastening portion 18 comprises an elastic cord made up by covering the peripheral outer surface of a neoprene rubber cord with a polypropylene thread. The fastening portion 18 is made up by arranging the elastic cord of a predetermined length inside a strip-shaped member, forming a small ring in a marginal portion thereof protruding from the end of the strip-shaped member, and then sewing the ends of the small ring together.

According to the present embodiment, the first partition member 2a comprises a first end fastening portion 18a provided at the first end 2a of each of both side edges 11 and the intermediate portion 16 and a primary second end fastening portion 18b provided at the second end 2b. Similarly, the second partition member 3b comprises a secondary second end fastening portion 18c provided at the second end 3b of both side edges 11, respectively.

The second partition member 3 thus made up has its first end 3a closed by being sewed together with the strip-shaped member, such that it is sewed, at its first end 3a, to the first side surface at the first end 2a of the first partition member 2 so as to be integrated therewith. Accordingly, the cargo net 1 is constituted such that the first partition member 2 and the second partition member 3 are connected with each other at the first ends 2a and 3a, while the second ends 2b and 3b thereof are pivotable around these first ends 2a and 3a.

Next is a description of the action and structure of the cargo net 1 thus constituted in accordance with the present embodiment. First, there will be explained a case where the cargo net 1 is attached to the luggage compartment 5 of the vehicle 4. Although various methods may be employed in attaching the cargo net 1 of the present embodiment to the luggage compartment 5, a method of attachment with the seat back 15 being put up will be explained as a first example.

In this case, a catching portion 20 is provided beforehand in the four corners and an intermediate portion on the rear surface 7 of the seat back 15 as well as in a position on either inner surface of the luggage compartment 5 at a predetermined height from the floor 5a, respectively. Each catching portion 20 comprises a shaft and a flange provided at a distal end of the shaft (see FIG. 3).

Figure 3:
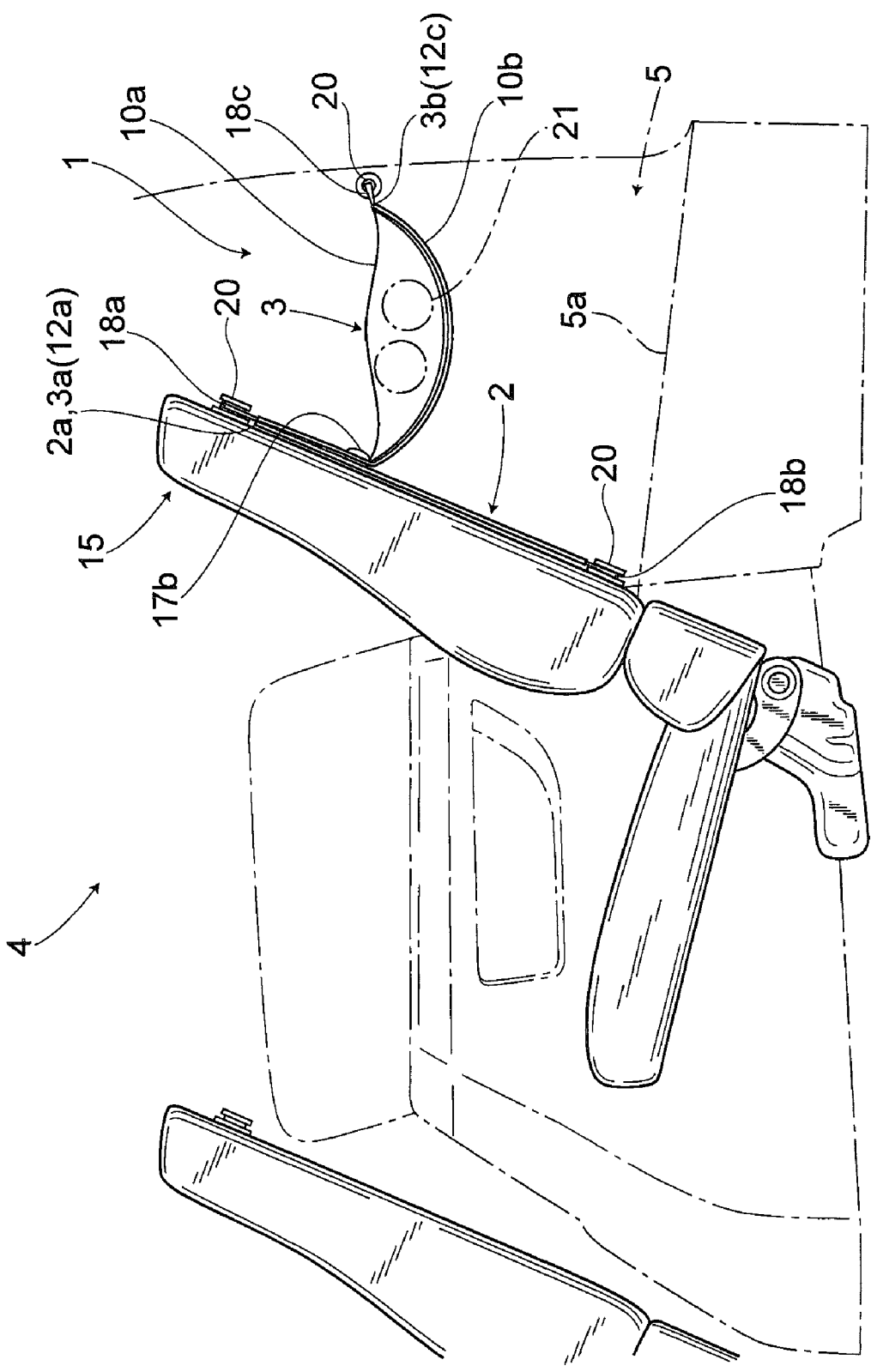
FIG. 3 is a side view showing the first example of use of the cargo net in accordance with the first embodiment of the present invention.

First, as shown in FIG. 3, the first partition member 2 is attached to the seat back 15 installed in the vehicle 4. The first partition member 2 is attached to the rear surface 7 of the seat back 15 by hanging the first end fastening portion 18a on the shaft of the catching portion 20 at the upper end of the seat back 15 to engage the first end fastening portion 18a with the catching portion 20, and then hanging the primary second end fastening portion 18b on the shaft of the catching portion 20 at the lower end of the seat back 15 to engage the primary second end fastening portion 18b with the catching portion 20.

Subsequently, the center of the second partition member 3 in the transverse direction is fixed to the first partition member 2, using the center button 17b, and then the secondary second end fastening portion 18c is engaged with the catching portion 20 on both the inner surfaces of the luggage compartment 5. As a result, the second partition member 3 is held in a position at a predetermined height from the floor 5a of the luggage compartment 5. In the present embodiment, the first partition surface 10a of the second partition member 3 is arranged at the upper side of the luggage compartment 5.

As described above, the cargo net 1 comprises the first partition member 2 and the second partition member 3 connected to the first partition member 2 at the ends 2a and 3a so that it is detachably attached to the luggage compartment 5 of the vehicle 4, wherein the first partition member 2 and the second partition member 3 are each formed in a pouched shape, and include the openable-and-closable portions 12a, 12b, and 12c on the center side of said luggage compartment 5, and that the second partition member 3 is held in the position at a predetermined height from the floor 5a of the luggage compartment 5.

Thus, the cargo net 1 enables the luggage 21 etc. stored in the second partition member 3 to be held in a manner not contacting the floor 5a of the luggage compartment 5, thus making it possible to prevent the stored luggage 21 from being damaged by the vibration of the vehicle 4 transmitted from the floor 5a of the luggage compartment 5.

Moreover, the cargo net 1 allows the transversal center of the second partition member 3 to be fixed to the first partition member 2, using the center button 17b.

Accordingly, substantial deflection of the second partition member 3 can be prevented in the cargo net 1, thus enabling the stored luggage 21 to be held more reliably with the same being not in contact with the floor 5a of the luggage compartment 5. Accordingly, the cargo net 1 makes it possible to more reliably prevent the stored luggage 21 from being damaged by the vibrations of the vehicle 4 transmitted from the floor 5a of the luggage compartment 5.

Moreover, the second partition member 3 comprises the openable-and-closable portion 12c at the second end 3b, thus making it easy for a user to take the luggage 21 etc. in and out of the second partition member 3 from the rear side of the luggage compartment 5.

Moreover, the partition surfaces 10 of the first partition member 2 and the second partition member 3 are formed of a netted fabric, respectively, thus making it possible to visually inspect from external how the stored luggage 21 actually is being stored.

Furthermore, the second partition member 3 comprises the first partition surface 10a formed of a densely-netted fabric that is arranged at the upper side of the luggage compartment 5, thus enabling the stored luggage 21 to be prevented from being seen through a window from the outside.

Moreover, the first end 2a of the first partition member 2 includes the openable-and-closable portion 12a, thus enabling a passenger sitting on the seat to easily take the luggage 21 in and out of the first partition member 2 through this openable-and-closable portion 12a.

It should be further noted that this first partition member 2 allows the luggage 21 stored in the first partition member 2 to be held in a stable condition due to the same being fixed onto the rear surface 7 of a backrest 15a of the seat back 15.

Figure 4:
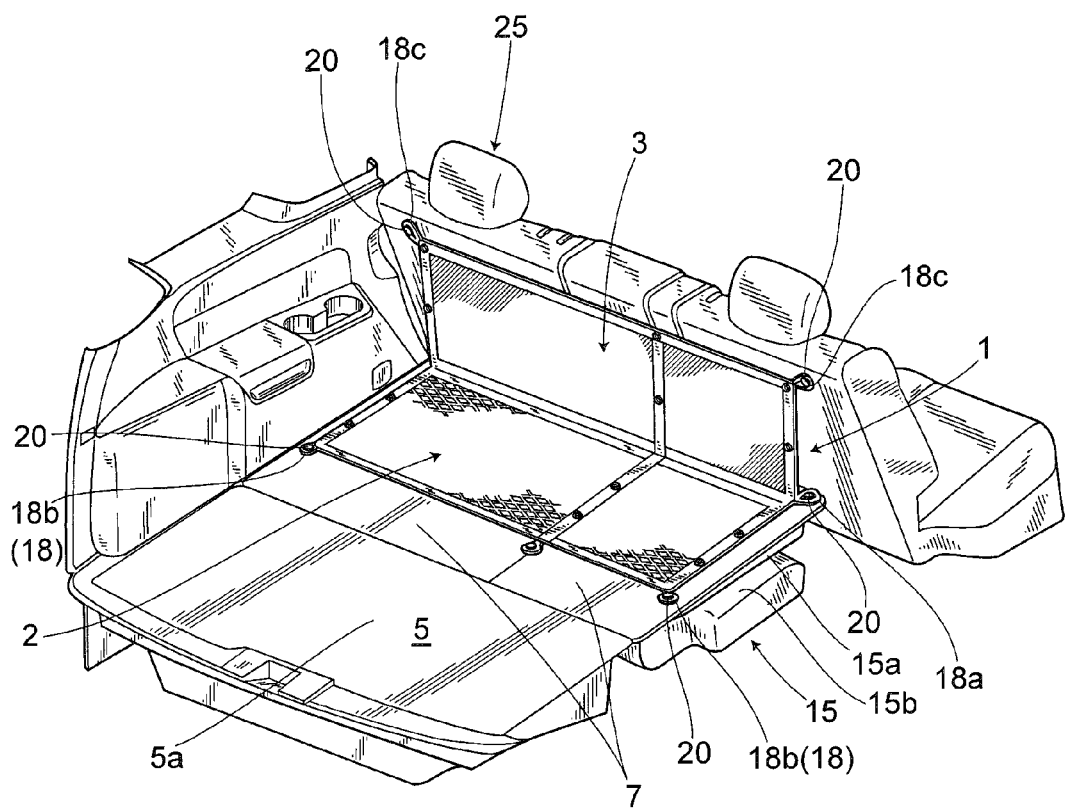
FIG. 4 is a perspective view showing a second example of use of the cargo net in accordance with the first embodiment of the present invention.

Next, another method of attachment with the seat back 15 being reclined forward will be explained as a second example. In this example, the backrest 15a of the seat back 15 is reclined forward to abut onto the seating surface 15b, as shown in FIG. 4. As a result, the floor 5a of the luggage compartment 5 increases in width by the length of the rear surface 7 of the seat back 15.

Figure 5:
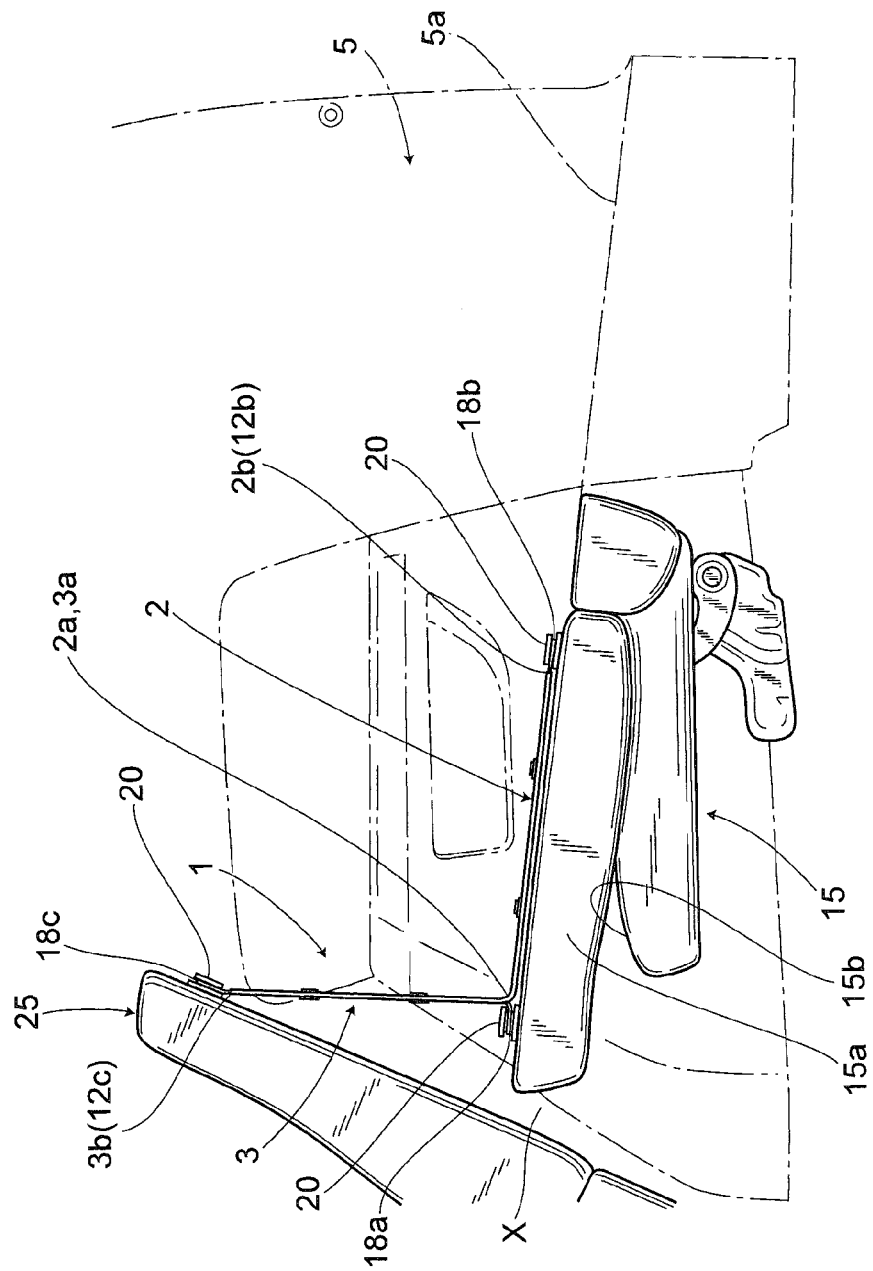
FIG. 5 is a side view showing the second example of use of the cargo net in accordance with the first embodiment of the present invention.

At this moment, the first partition member 2 is fixed to the rear surface 7 of the seat back 15 like in the above-mentioned first example. On the other hand, the second partition member 3 allows the secondary second end fastening portions 18c to engage with two catching portions 20, respectively, said catching portions 20 being provided beforehand at the upper end on the rear surface 7 of a front seat back 25. In this way, the cargo net 1 is allowed to cover continuously from the rear surface 7 of the flat seat back 15 up to the rear surface 7 of the front seat back 25 provided substantially vertically, so that it is attached so as to have a Letter L profile in a side view, as shown in FIG. 5.

In this way, the cargo net 1 is arranged so as to cover continuously from the rear surface 7 of the flat seat back 15 up to the rear surface 7 of the front seat back 25 provided substantially vertically, so that the cargo net 1 can close a clearance X between a front end of the rear surface 7 of the seat back 15 and the front seat back 25, thus preventing the luggage 21 etc. from dropping into the clearance X.

In that case, the second end 3b of the second partition member 3 is arranged adjacent to the upper end of the front seat back 25. Accordingly, the cargo net 1 enables a passenger sitting down on the front seat to easily take the luggage 21 etc. in and out through the openable-and-closable portion 12c provided at the second end 3b of the second partition member 3.

Moreover, since the second end 2a of the first partition member 2 is arranged at the rear part of the luggage compartment 5, the luggage 21 etc. can be easily taken in and out through the openable-and-closable portion 12b provided at the second end 2b of the first partition member 2 from the rear side of the luggage compartment 5.

Figure 6:
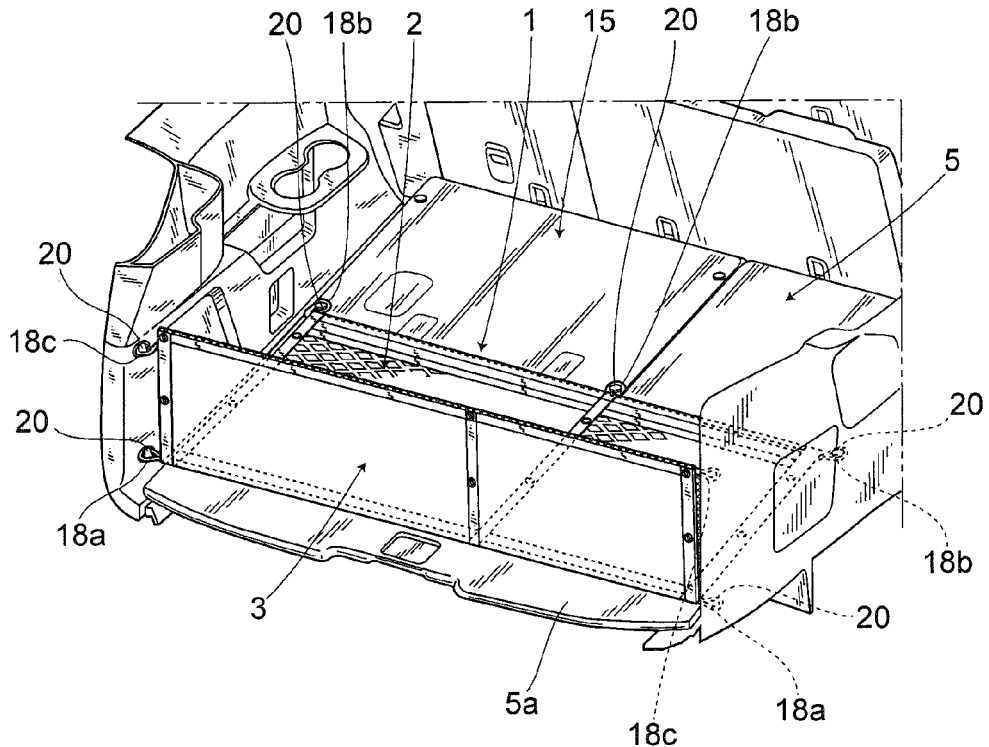
FIG. 6 is a perspective view showing a third example of use of the cargo net in accordance with the first embodiment of the present invention.

Alternatively, as shown in FIG. 6 illustrating a third example, the cargo net 1 may be arranged so that the second partition member 3 is vertically provided at the rear end of the luggage compartment 5. In that case, the first partition member 2 is attached so as to extend along the floor 5a of the luggage compartment 5 by engaging the primary second end fastening portion 18b with the catching portion 20 provided at the lower end of the rear surface 7 of the seat back 15, while engaging the first end fastening portion 18a with the catching portion 20 provided on the floor 5a at the rear end of the luggage compartment 5. Moreover, the second partition member 3 is vertically provided at the rear end of the luggage compartment 5 by engaging the secondary second end fastening portion 18c with the catching portion 20 provided on either side surface of the luggage compartment 5.

Thus, the cargo net 1 is capable of preventing the luggage 21 from dropping accidentally to the outside of the vehicle 4 from the luggage compartment 5 due to the second partition member 3 being vertically provided at the rear end of the luggage compartment 5.

Second Embodiment

Figure 7:
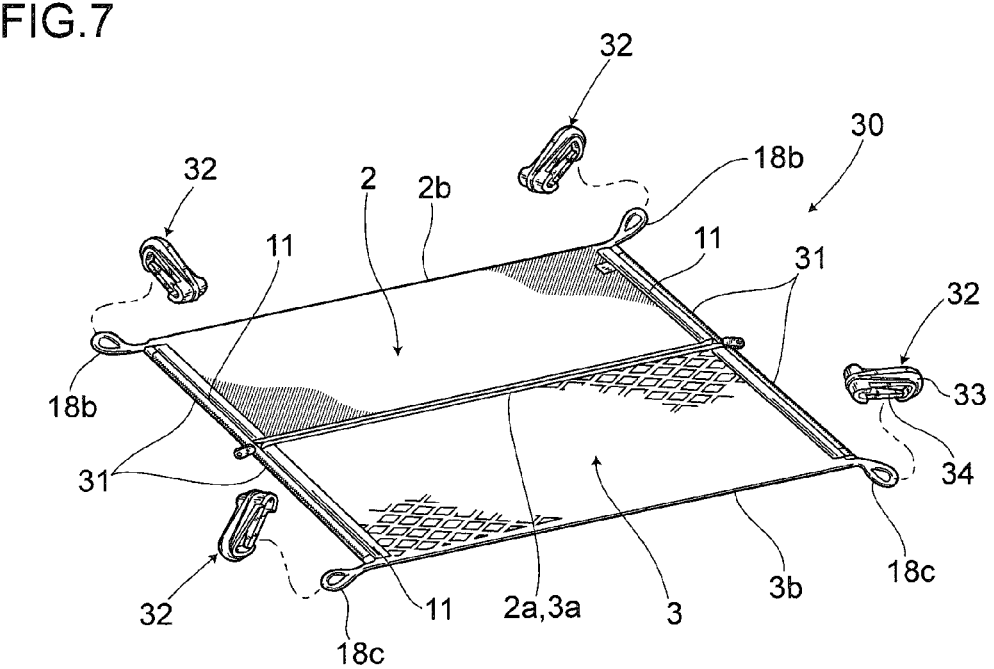
FIG. 7 is a perspective view showing an overall structure of a cargo net in accordance with a second embodiment of the present invention.

Next, a second embodiment of the present invention will be explained with reference to the attached drawings. A cargo net 30 shown in FIG. 7 differs from the cargo net 1 of the first embodiment in that the cargo net 30 is provided with a side slide fastener (or zipper) 31 as a junction means to join the first partition member 2 and the second partition member 3 along the transversal outer edge on either side edge as well as snaps 32 detachably provided in the fastening portion 18.

The side slide fastener 31 provided in the cargo net 30 is constituted so that both side edges of the first partition member 2 and the second partition member 3 can be joined together with the former being laid on top of the latter. By closing the side slide fastener 31, the cargo net 30 takes a horizontally long rectangular shape with the first partition member 2 being laid on top of the second partition member 3, while, at its upper end, the second end of the first partition member 2 is laid on that of the second partition member 3, thereby forming an opening.

The snap 32 detachably provided in the fastening portion 18 comprises a hook-shaped engagement piece 33 and a movable piece 34 that is biased toward a closing direction in a manner capable of opening and closing the opening of the engagement piece 33, such that it is capable of being attached to and detached from a ring-shaped hook 35 provided beforehand in the luggage compartment 5 through a simple one-touch operation.

Next, the action and structure of the above-structured cargo net 30 of the present embodiment will be explained. First, there will be given an explanation of a case where the cargo net 30 is attached to the luggage compartment 5 of the vehicle 4.

First, an explanation will be given about a case where the cargo net 30 is attached with the side slide fastener 31 being opened, i.e., in such a condition that the first partition member 2 and the second partition member 3 are spread out. In that case, the cargo net 30 allows the snap 32, provided at each fastening portion 18 at the four corners, i.e., at the primary second end fastening portions 18b of the first partition member 2 and the secondary second end fastening portions 18c of the second partition member 3, to be attached to the respective ring-shaped hook 35 provided at the four corners on the inner side surface in the neighborhood of the floor 5a.

Then, the floor 5a of the luggage compartment 5 is covered with the cargo net 30, as shown in FIG. 8. Thus, the cargo net 30 enables the luggage 21 etc. to be taken in and out through the openable-and-closable portion 12c provided at the second end 3b of the second partition member 3. Furthermore, the cargo net 30 can hold the luggage 21 etc. in position by inserting the luggage 21 etc. into a space between the cargo net 30 and the floor 5a of the luggage compartment 5, due to the luggage 21 thus inserted being pressed against the floor 5a.

Next, an explanation will be given about a case where the cargo net 30 is attached with the side slide fastener 31 being closed, i.e., in such a condition that the first partition member 2 and the second partition member 3 are overlapped with each other and folded. In that case, the cargo net 30 allows the two of the snaps 32, provided either at the primary second end fastening portions 18b or at the secondary second end fastening portions 18c, to be detached therefrom and then allows those snaps 32 to be attached to the first end fastening portions 18a, as shown in FIG. 9.

Thus, the snap 32 is then disposed in the four corners of the cargo net 30 in a folded condition, respectively. In that condition, the cargo net 30 allows the snap 32 attached to each first end fastening portion 18a to engage with the hook 35 provided beforehand in the two positions on the inner surfaces of the luggage compartment 5 in the neighborhood of the floor 5a on the rear end of the luggage compartment 5.

Moreover, the cargo net 30 allows, at its upper end, each snap 32 provided in the primary second end fastening portion 18b to engage with said secondary second end fastening portion 18c while allowing each secondary second end fastening portion 18c to engage with the catching portion 20 provided beforehand in two positions on the inner side surface at the predetermined height on the floor 5a. Thus way, the cargo net 30 is attached to the luggage compartment 5.

Then, the lower section of the rear end of the luggage compartment 5 is, as shown in FIG. 10, is closed by the cargo net 30. Thus way, the cargo net 30 enables the luggage 21 etc. to be prevented from accidentally dropping from the luggage compartment 5 to the outside of the vehicle 4.

Moreover, since the cargo net 30 allows both side edges 11 of the first partition member 2 and the second partition member 3 to be joined together using the side slide fasteners 31, the luggage 21 etc. can be held between the first partition member 2 and the second partition member 3 through the opening formed by overlapping the second ends 2b and 3b of the first partition member 2 and the second partition member 3 with each other.

Moreover, since the openable-and-closable portions 12b and 12c are provided at the second ends 2b and 3b of the first partition member 2 and the second partition member 3, respectively, it is needless to say that the luggage 21 can be taken in and out through these openable-and-closable portions 12b and 12c, respectively.

Moreover, since the cargo net 30 is detachably provided with the snaps 32 in the fastening portion 18, the cargo net 30 is able to be easily attached to and detached from the ring-shaped hook 35, while permitting the arrangement of the snaps 32 to be suitably varied depending on the configuration of the cargo net 30.

The present invention is not limited to the foregoing embodiments, and various modification is possible within the scope of the present invention.

What is claimed is:

1. A cargo net for a vehicle detachably attached to a luggage compartment of the vehicle, comprising:
   a first partition member;
   a second partition member having one end thereof connected with one end of said first partition member; and
   a junction means to detachably join said first partition member and said second partition member,
   wherein said first partition member is formed in a pouched shape and comprises at least one openable and closable portion provided at an outer edge in a longitudinal direction of said first partition member, and
   wherein said second partition member is formed in a pouched shape and comprises at least one openable and closable portion provided at an outer edge in a longitudinal direction of said second partition member.

2. The cargo net for a vehicle according to claim 1, wherein said first partition member and said second partition member respectively include a partition surface formed of a netted fabric.

3. The cargo net for a vehicle according to claim 2, wherein said partition surface includes a first partition surface defining a first side surface and a second partition surface defining a second side surface, wherein said first partition surface is netted more densely than said second partition surface.

4. The cargo net for a vehicle according to claim 1, wherein one of said first and second partition members is provided at its end with a fastening portion that engages with a rear surface of a seat installed in said vehicle.

5. The cargo net for a vehicle according to claim 2, wherein one of said first and second partition members is provided at its end with a fastening portion that engages with a rear surface of a seat installed in said vehicle.

6. The cargo net for a vehicle according to claim 3, wherein one of said first and second partition members is provided at its end with a fastening portion that engages with a rear surface of a seat installed in said vehicle.

7. The cargo net for a vehicle according to claim 1, wherein at least one of said first and second partition members covers a rear surface of a seat installed in said vehicle.

8. The cargo net for a vehicle according to claim 2, wherein at least one of said first and second partition members covers a rear surface of a seat installed in said vehicle.

9. The cargo net for a vehicle according to claim 3, wherein at least one of said first and second partition members covers a rear surface of a seat installed in said vehicle.

10. The cargo net for a vehicle according to claim 4, wherein at least one of said first and second partition members covers a rear surface of a seat installed in said vehicle.

11. The cargo net for a vehicle according to claim 5, wherein at least one of said first and second partition members covers a rear surface of a seat installed in said vehicle.

12. The cargo net for a vehicle according to claim 6, wherein at least one of said first and second partition members covers a rear surface of a seat installed in said vehicle.

* * * * *